US012591457B1

(12) United States Patent
Murthy

(10) Patent No.: US 12,591,457 B1
(45) Date of Patent: Mar. 31, 2026

(54) RECOMMENDED CONFIGURATIONS OF MACHINE LEARNING COMPUTING RESOURCES

(71) Applicant: Amazon Technologies, Inc., Seattle, WA (US)

(72) Inventor: Mahit Murthy, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 916 days.

(21) Appl. No.: 17/808,488

(22) Filed: Jun. 23, 2022

(51) Int. Cl.
*G06N 5/04* (2023.01)
*G06F 9/50* (2006.01)

(52) U.S. Cl.
CPC ................ *G06F 9/50* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 9,996,804 B2 | 6/2018 | Bowers et al. | |
| 10,990,901 B2 | 4/2021 | Deo et al. | |
| 11,061,902 B2 | 7/2021 | Idicula et al. | |
| 2020/0125545 A1* | 4/2020 | Idicula | G06N 20/20 |
| 2021/0152385 A1 | 5/2021 | Carroll et al. | |

OTHER PUBLICATIONS

Khan, Tahseen, Wenhong Tian, Guangyao Zhou, Shashikant Ilager, Mingming Gong, and Rajkumar Buyya. "Machine learning (ML)-centric resource management in cloud computing: A review and future directions." Journal of Network and Computer Applications 204. Available online May 6, 2022. 17 pages. (Year: 2022).*

(Continued)

*Primary Examiner* — Vincent Gonzales
(74) *Attorney, Agent, or Firm* — S. Scott Foster; Kowert, Hood, Munyon, Rankin & Goetzel, P.C.

(57) ABSTRACT

A system for generating recommended computing resource configurations for machine learning services is described. The system includes computing resources to host a machine learning model. The system includes a machine learning recommendation service to receive, from a client via an interface, a request to monitor the computing resources. The recommendation service monitors the machine learning model, including recording utilization metrics of the computing resources, recording the different inference requests, and recording the respective inferences. The recommendation service generates a recommended computing resource configuration for the machine learning model based on the utilization metrics and an optimization objective for utilizing computing resources. The recommendation service determines to provide the recommended computing resource configuration based on an accuracy analysis performed for the machine learning model deployed on the recommended computing resource configuration. The recommendation service provides the recommended computing resource configuration for the deployed machine learning model.

20 Claims, 9 Drawing Sheets

(56) References Cited

OTHER PUBLICATIONS

Dünner, Celestine, Thomas Parnell, Kubilay Atasu, Manolis Sifalakis, and Haralampos Pozidis. "Understanding and optimizing the performance of distributed machine learning applications on apache spark." In 2017 IEEE international conference on big data (big data), pp. 331-338. IEEE, 2017. (Year: 2017).*

Lee, Woo-Yeon, Yunseong Lee, Joo Seong Jeong, Gyeong-In Yu, Joo Yeon Kim, Ho Jin Park, Beomyeol Jeon et al. "Automating system configuration of distributed machine learning." In 2019 IEEE 39th International Conference on Distributed Computing Systems (ICDCS), pp. 2057-2067. IEEE, 2019. (Year: 2019).*

* cited by examiner

600

Deploy a machine learning model on computing resources that are configured to use the machine learning model to generate inferences in response to inference requests
602

Monitor the machine learning model deployed on the computing resources
604

Recording utilization metrics of the one or more computing resources performing the different inference requests
606

Recording the different inference requests
608

Recording the different inferences
610

Generating a recommended computing resource configuration for the machine learning model based on the utilization metrics of the computing resources and an optimization objective for utilizing the computing resources
612

Performing an accuracy analysis for the machine learning model deployed on the recommended computing resource configuration using the recorded different inference requests and the recorded respective inferences
614

Providing the recommended computing resource configuration for the deployed machine learning model
616

```
┌─────────────────────────────────────────────────────────────┐
│ Recording utilization metrics of computing resources          │
│ implementing a machine learning model to generate different   │
│ inferences in response to different inference requests        │
│                          702                                  │
└─────────────────────────────────────────────────────────────┘
```

| Determine CPU utilization metrics 704 | Determine GPU utilization metrics 706 | Determine memory utilization metrics 708 | Determine model server utilization metrics 710 |

```
┌─────────────────────────────────────────────────────────────┐
│ Identify a bottleneck resource of the computing resources     │
│ according to the CPU utilization metrics, the GPU utilization │
│ metric, the memory utilization metrics, and the model server  │
│ utilization metrics compared to respective metric thresholds  │
│                          712                                  │
└─────────────────────────────────────────────────────────────┘
```

```
┌─────────────────────────────────────────────────────────────┐
│ Generating a recommended computing resource configuration for │
│ the machine learning model based on the bottleneck resource   │
│                          714                                  │
└─────────────────────────────────────────────────────────────┘
```

```
┌─────────────────────────────────────────────────────────────┐
│ Providing the recommended computing resource configuration for│
│ the deployed machine learning model                           │
│                          716                                  │
└─────────────────────────────────────────────────────────────┘
```

*FIG. 7*

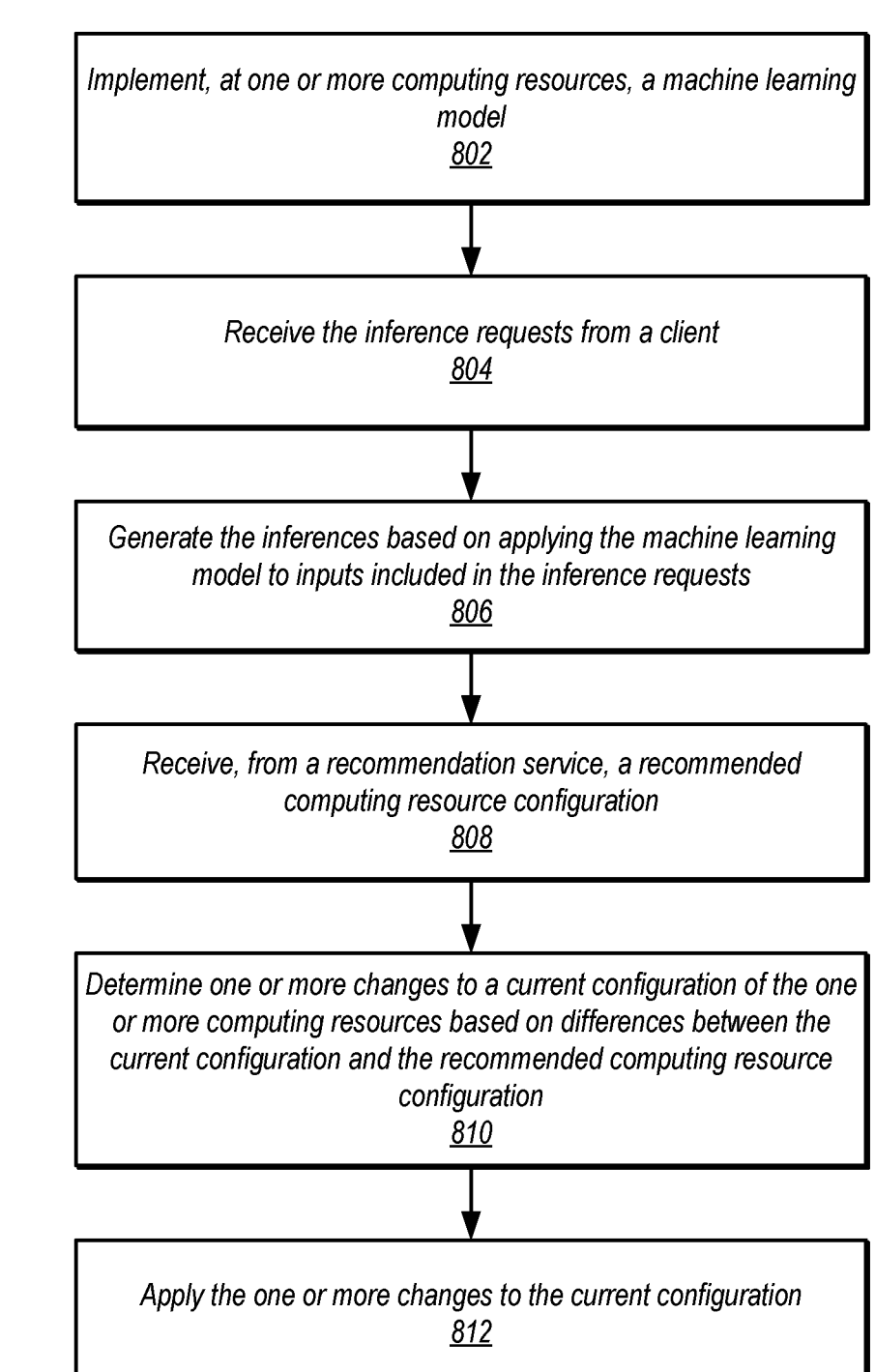

*800*

Implement, at one or more computing resources, a machine learning model
802

Receive the inference requests from a client
804

Generate the inferences based on applying the machine learning model to inputs included in the inference requests
806

Receive, from a recommendation service, a recommended computing resource configuration
808

Determine one or more changes to a current configuration of the one or more computing resources based on differences between the current configuration and the recommended computing resource configuration
810

Apply the one or more changes to the current configuration
812

*FIG. 8*

RECOMMENDED CONFIGURATIONS OF MACHINE LEARNING COMPUTING RESOURCES

BACKGROUND

Machine learning services include various computing resources configured to host at least a portion of a machine learning model. The machine learning model may be processed by the computing resources in order to generate inferences according to input datasets. Resource configurations may be applied to deploy and provision the computing resources to host the machine learning model. The resource configuration may be maintained while the machine learning model is generating inferences.

Over time, performance of the machine learning model may result in some of the computing resources being underutilized or overutilized. The computing resources may become inefficient with respect to the machine learning model. The computing resources are typically unequipped to change their own configuration to improve utilization.

BRIEF DESCRIPTION OF THE DRAWINGS

FIG. 6 is a flowchart diagram illustrating a method 600 for determining recommended computing resource configurations for a machine learning model, according to some embodiments.

FIG. 7 is a flowchart diagram depicting a method 700 for generating a recommended computing resource configuration for hosting a machine learning model, according to some embodiments.

FIG. 8 is a flowchart diagram illustrating a method 800 for applying changes to a computing resource configuration, according to some embodiments.

Figure 1:
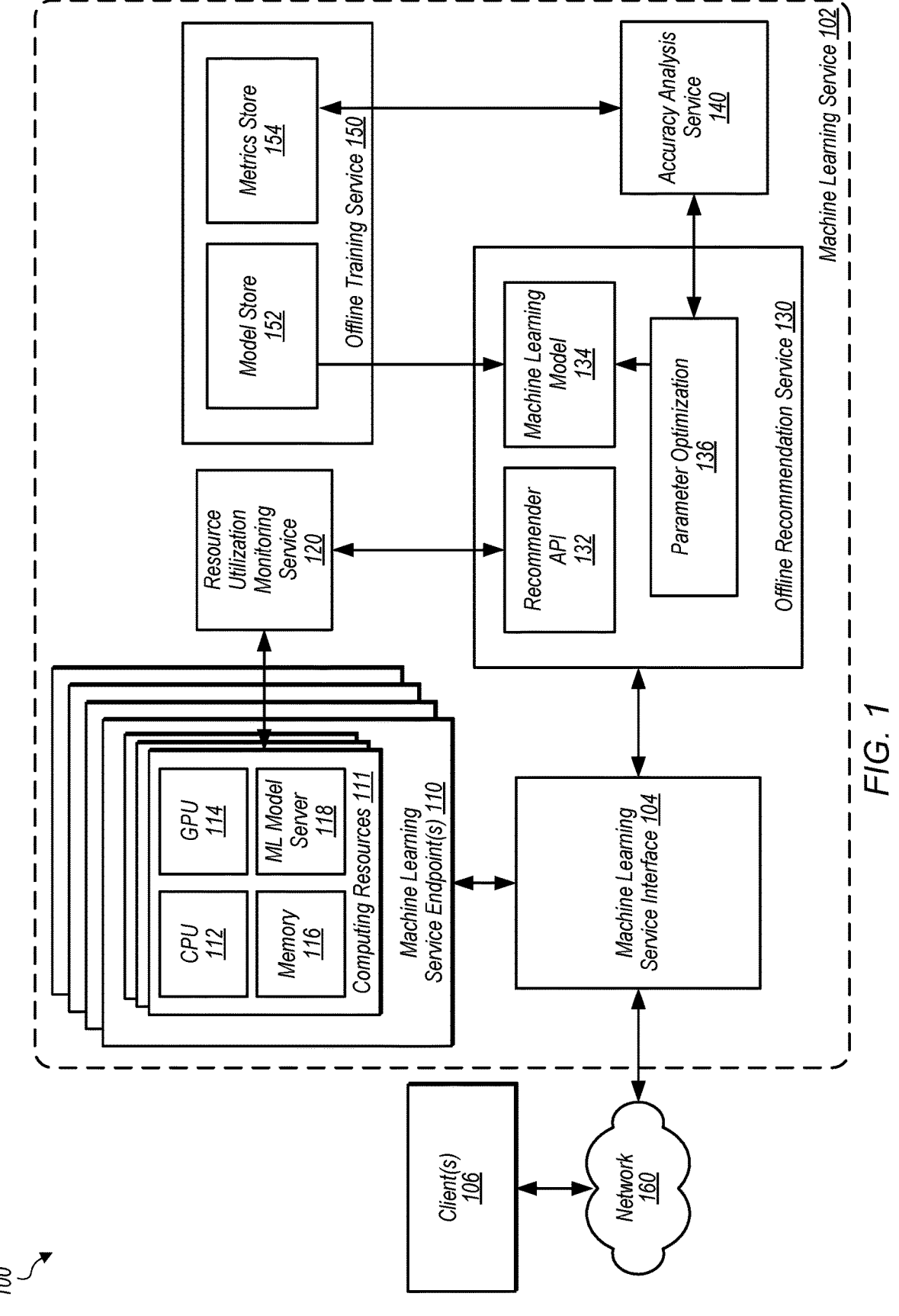
FIG. 1 illustrates a system 100 for optimizing performance of a machine learning service 102, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various systems and methods for optimizing performance of a machine learning service are described herein. The machine learning service may include one or more computing resources which are configured to host a machine learning model to generate inferences in response to inference requests. The computing resources may include endpoints that further include various hardware computer components. The endpoints may include central processing units (CPUs), graphics processing units (GPUs), memories, and machine model servers, in various implementations.

Optimizing performance may include an offline analysis of hosting of the machine learning model. The machine learning service may record utilization metrics of the computing resources. The utilization metrics may include a CPU utilization metric, a GPU utilization metric, a memory utilization metric, and a model server utilization metric. In some implementations, the utilization metrics may be expressed as a percentage of utilization relative to a maximum possible utilization of respective computing resources. The performance of the machine learning model on the computing resources may be modified based on a determination that the machine learning model is utilizing too much or too little of the respective computing resources. The utilization metrics may be compared against respective utilization thresholds or respective target utilizations.

A machine learning recommendation service may provide a recommended computing resource configuration that indicates one or more modifications that may be made to the configuration of computing resources. In some situations, the recommended computing resource configuration may target a desired utilization level such that implementation of the recommended computing resource configuration would result in the computing resources performing operations at the desired utilization level. The modifications may reconfigure the computing resources to increase utilization of underutilized computing resources. Alternatively, the modifications may reconfigure the computing resources to decrease utilization of overutilized computing resources. Some example modifications may include increasing or decreasing a quantity of the computing resources that are hosting the machine learning model, increasing or decreasing throughput of individual ones of the computing resources.

An accuracy analysis may also be performed on the generated inferences to determine how accurate the generated inferences are with the machine learning model on the current configuration of the computing resources. The accuracy analysis may report an accuracy level that may be expressed as a percentage indicating a percentage of accurate inferences. Alternatively, the accuracy level may be expressed as a percentage indicating a percentage of inaccurate inferences. A projected accuracy level of the recommended computing resource configuration may also be calculated based on machine learning models configured to predict accuracy of computing resource configurations.

The machine learning recommendation service may determine whether to present the recommended computing resource configuration based on the projected accuracy level meeting an accuracy threshold. For example, the machine learning recommendation service may present the recommended computing resource configuration in response to a determination that the projected accuracy level meets or exceeds a minimum accuracy level. In other situations, the machine learning recommendation service may present the recommended computing resource configuration with a comparison between the accuracy level of the current configuration and the projected accuracy level of the recommended computing resource configuration.

In one aspect, a system for monitoring computing resources that host a machine learning model is described. The system may include one or more computing resources configured to host a machine learning model to generate respective inferences according to different inference requests. The system may also include one or more processors and a memory storing instructions that, when executed on or across the one or more processors, cause the one or more processors to implement a machine learning recommendation service. The machine learning recommendation service may receive, from a client via an interface, a request to monitor the one or more computing resources. The machine learning recommendation service may also monitor the machine learning model deployed on the one or more computing resources. The monitoring may include recording utilization metrics of the one or more computing resources performing the different inference requests, recording the different inference requests, and recording the respective inferences. The machine learning recommendation service may also generate a recommended computing resource configuration for the machine learning model based, at least in part, on the utilization metrics of the one or more computing resources and an optimization objective for utilizing computing resources. The machine learning recommendation service may further make a determination to provide the recommended computing resource configuration based, at least in part, on an accuracy analysis performed for the machine learning model deployed on the recommended computing resource configuration using the recorded different inference requests and the recorded respective inferences. The machine learning recommendation service may provide the recommended computing resource configuration for the deployed machine learning model.

In another aspect, a method for monitoring computing resources hosting a machine learning model is described. The method may include monitoring a machine learning model deployed on one or more computing resources that use the machine learning model to generate respective inferences according to different inference requests. The monitoring may include recording utilization metrics of the one or more computing resources performing the different inference requests, recording the different inference requests, and recording the respective inferences. The method may also include generating a recommended computing resource configuration for the machine learning model based, at least in part, on the utilization metrics of the one or more computing resources and an optimization objective for utilizing computing resources. The method may further include making a determination to provide the recommended computing resource configuration based, at least in part, on an accuracy analysis performed for the machine learning model deployed on the recommended computing resource configuration using the recorded different inference requests and the recorded respective inferences. The method may also include providing the recommended computing resource configuration for the deployed machine learning model.

In yet another aspect, one or more computer-readable storage media for monitoring computing resources hosting a machine learning model are described. The one or more computer-readable storage media store instructions that, when executed on or across one or more processors, cause the one or more processors to perform operations. The operations may include monitoring a machine learning model deployed on one or more computing resources that use the machine learning model to generate respective inferences according to different inference requests. The monitoring may include recording utilization metrics of the one or more computing resources performing the different inference requests, recording the different inference requests, and recording the respective inferences. The operations may also include generating a recommended computing resource configuration for the machine learning model based, at least in part, on the utilization metrics of the one or more computing resources and an optimization objective for utilizing computing resources. The operations may further include determining to provide the recommended computing resource configuration based, at least in part, on an accuracy analysis performed for the machine learning model deployed on the recommended computing resource configuration using the recorded different inference requests and the recorded respective inferences. The operations may also include providing the recommended computing resource configuration for the deployed machine learning model.

FIG. 1 illustrates a system 100 for optimizing performance of a machine learning service 102, according to some embodiments. The machine learning service 102 may be implemented by one or more computing devices. In some embodiments, the machine learning service 102 may include various computing hardware implemented across one or more machine learning service endpoints 110. The machine learning service 102 may also include additional services to support additional aspects, such as a resource utilization monitoring service 120, an offline recommendation service 130, an accuracy analysis service 140, and an offline training service 150, according to various embodiments. The machine learning service 102 may be implemented at a service provider network configured to provide services to one or more clients 206 via a network 260.

The machine learning service endpoints 110 may be configured as a cluster, in some embodiments. For example, a plurality of the machine learning service endpoints 110 may be configured as a group to host a machine learning model to generate inferences in response to inference requests.

Individual ones of the machine learning service endpoints 110 may include multiple computing resources 111 to host a machine learning model, in some embodiments. In some embodiments, the machine learning service endpoints 110 may include virtualized computing resources, such as compute instances, configured to be deployable upon request from the client 106 or the machine learning service 102. The machine learning service endpoints 110 may respectively include a central processing unit (CPU) 112, a graphics processing unit (GPU) 114, a memory 116, and a machine learning model server 118, according to various embodiments. The machine learning model server 118 may also be interchangeably referred to as a model server. The machine learning model server 118 may be configured to host a machine learning model across the CPU 112, the GPU 114, and the memory 116. The cluster of machine learning service endpoints 110 may be allocated or provisioned for a client 106 as part of a service level agreement between the client 106 and the machine learning service 102.

The machine learning model may be executed by one or more of the CPU 112, the GPU 114, and the memory 116 to generate inferences in response to inference requests from clients 106. The inference requests may include inputs that may be processed by the machine learning model to generate an output that includes the inferences. In various implementations, the machine learning model may have different system requirements or resource utilizations. For example, a first machine learning model may be more computationally intensive with the CPU 112, while a second machine learning model may be more computationally intensive with the GPU 114. In some situations, the machine learning model may be more efficient when processed by the CPU 112 rather than the GPU 114. In other situations, the machine learning model may be more efficient when processed by the GPU 114 rather than the CPU 112. In other situations, the machine learning model may be more computationally demanding on the memory 116.

The machine learning service 102 may also include a resource utilization monitoring service 120, according to some embodiments. The resource utilization monitoring service 120 may also be interchangeably referred to as a monitoring service. The monitoring service 120 may be configured to record utilization metrics from computing resources 111 that implement machine learning models. For example, the monitoring service 120 may record utilization metrics for the CPU 112, the GPU 114, the memory 116, and the model server 118. The utilization metrics may indicate a level of utilization for the computing resources 111. For example, the utilization metrics may include a CPU utilization 122, a GPU utilization 124, a memory utilization 126, and a model server utilization 128. In some embodiments, the utilization metrics may be expressed as a percentage of resource utilization. As an illustrative example, a given utilization metric may indicate that the resource is currently X % utilized with a given machine learning model.

The utilization metrics may be aggregated across each of the machine learning service endpoints 110 that are implementing a given machine learning model. For example, the monitoring service 120 may be configured to monitor a cluster of machine learning service endpoints 110 by collecting the utilization metrics for the cluster as a collective set. As another example, the monitoring service 120 may be configured to record utilization metrics for individual ones of the machine learning service endpoints 110. The monitoring service 120 may provide the utilization metrics to the offline recommendation service 130 to determine a recommended computing resource configuration for the machine learning service 102.

The offline recommendation service 130 may be implemented by one or more computing devices provisioned for the machine learning service 102, according to some embodiments. The offline recommendation service 130 may also be interchangeably referred to as recommendation service 130. The recommendation service 130 may be configured to determine recommended configurations for various computing resources 111 that are provisioned for the machine learning service 102. In some embodiments, the configurations may describe a quantity of the computing resources 111 to be used for implementation of a given machine learning model. The configurations may also indicate the types of computing resources 111, such as compute instance types, that are deployed for the implementation of the given machine learning model. As yet another example, the configurations may also indicate that the given machine learning model should be executed on a type of computing resources 111 on respective ones of the machine learning service endpoints 110.

The recommendation service 130 may implement a recommendation application programmatic interface (API) 132 configured to receive information from the monitoring service 120, according to some embodiments. For example, the recommendation API 132 may be established to receive the utilization metrics from the monitoring service 120. The recommendation service 130 may receive the utilization metrics, including the CPU utilization 122, the GPU utilization 124, the memory utilization 126, and the model server utilization 128, for individual ones of the machine learning service endpoints 110 or clusters of the machine learning service endpoints 110.

The recommendation service 130 may include a representation of a machine learning model 134 that is deployed to the machine learning service endpoints 110 on behalf of a client 106, according to some embodiments. The machine learning model 134 may be maintained at the recommendation service 130 to allow aspects of the recommendation service 130 to make recommendations based on the functionalities or requirements of the machine learning model 134. In some embodiments, the recommendation service 130 may be configured to perform parameter optimization 136 for various parameters of the machine learning service 102. For example, the parameter optimization 136 may determine modifications to the parameters of the machine learning service endpoints 110 to better optimize efficiency or utilization of the computing resources 111 of the machine learning service endpoints 110. In some embodiments, the parameter optimization 136 may include hyperparameter optimization according to the machine learning model 134 on various input datasets that have been provided. For example, the hyperparameter optimization may include determining that a particular configuration of the computing resources 111 may be performed more efficiently by the machine learning model 134 for particular datasets. The parameter optimization 136 may also include a parameter search for specific parameters that may be adjusted to optimize performance of the machine learning model 134.

In some situations, the parameter optimization 136 may include an optimization objective. For example, the optimization objective may include reducing computational waste or underutilized computing resources (e.g., the CPU 112, the GPU 114, the memory 116, and the model server 118). As another example, the optimization objective may include increasing performance of the machine learning model, such as increasing a quantity of generated inferences within a certain period of time. In yet another example, the optimization objective may include reducing workloads on overutilized computing resources.

The machine learning service 102 may also include an accuracy analysis service 140 configured to determine respective accuracy levels for different configurations of the computing resources 111 to implement the machine learning model 134. In some embodiments, the accuracy analysis service 140 may include a benchmark harness configured to measure metrics for the machine learning model 134. The accuracy analysis service 140 may predict that particular recommended configurations of the computing resources 111 may have respective projected accuracy levels. The accuracy analysis service 140 may also record accuracy levels from previously executed iterations of the machine learning model 134 such that previous accuracy levels may influence subsequent accuracy level predictions. In some embodiments, the projected accuracy levels may be presented in addition to recommended computing resource configurations. For example, a recommended computing resource configuration may be provided to the client 106 with a corresponding projected accuracy level to indicate that switching to the recommended computing resource configuration would potentially result in the projected accuracy level for implementation of the machine learning model 134.

The accuracy analysis service 140 may include multiple types of accuracy analyses, according to various embodiments. For example, one type of accuracy analysis may include determining an accuracy level of the machine learning model 134 before and after modification of resources. The resources may be monitored to determine that accuracy levels are maintained after resources have been modified. Another type of accuracy analysis may include determining a performance level of the machine learning model 134 before and after the modification of the resources. The resources may be monitored to determine that performance levels are maintained after resources have been modified. The recommendation service 130 may use the types of accuracy analyses to determine whether the recommended resource configuration is accurate for the type of targeted performance.

The recommendation service 130 may also determine whether to present the recommended computing resource configuration based on the accuracy levels satisfying accuracy thresholds, according to some embodiments. For example, the recommendation service 130 may determine to present the recommended computing resource configuration to the client 106 based on the projected accuracy level being higher than a minimum accuracy threshold. The recommendation service 130 may refrain from presenting the recommended computing resource configuration when the projected accuracy level would significantly be lowered by switching to the recommended computing resource configuration. In some situations, the client 106 or the machine learning service 102 may determine that a small decrease in the projected accuracy level may be worth a significant increase in computational efficiency from the machine learning service endpoints 110.

The machine learning service 102 may also include an offline training service 140 configured to train machine learning models, including the machine learning model 134, according to some embodiments. The offline training service 150 may include a model store 152 and a metrics store 154. The model store 152 may be configured to store multiple machine learning models and different versions of the multiple machine learning models. The metrics store 154 may store various utilization metrics, such as the CPU utilization 122, the GPU utilization 124, the memory utilization 126, and the model server utilization 128, for respective ones of the multiple machine learning models or the different versions of the multiple machine learning models.

The offline training service 150 may train the machine learning models based on various input datasets and respective ones of the utilization metrics to improve the efficiency and accuracy of the machine learning models implemented by the machine learning service 102. For example, the offline training service may analyze the utilization metrics and the recorded accuracy levels to determine whether the underlying machine learning model needs to be adjusted and how much to be adjusted. The offline training service 150 may provide trained versions of machine learning models, such as the machine learning model 134 to downline destinations. For example, the offline training service 150 may provide the machine learning model 134 to the offline recommendation service 130 or the machine learning service endpoints 110 for implementation.

The recommendation service 130 may also include a recommendation model configured to generate recommended computing resource configurations for deployment of the machine learning model 134, according to some embodiments. The recommendation service 130 may be configured to train the recommendation model according to the accuracy level performed by the accuracy analysis service 140. In some embodiments, the offline training service 150 may be configured to train the recommendation model. The recommendation service 130 may deploy the recommendation model to generate the recommended computing resource configurations, according to some embodiments. The recommendation service 130 may utilize any suitable type of machine learning model or combination of models to establish the recommendation model. The different configurations may be processed by the accuracy analysis service 140 to determine whether the configurations meet various accuracy or performance requirements.

Figure 2:
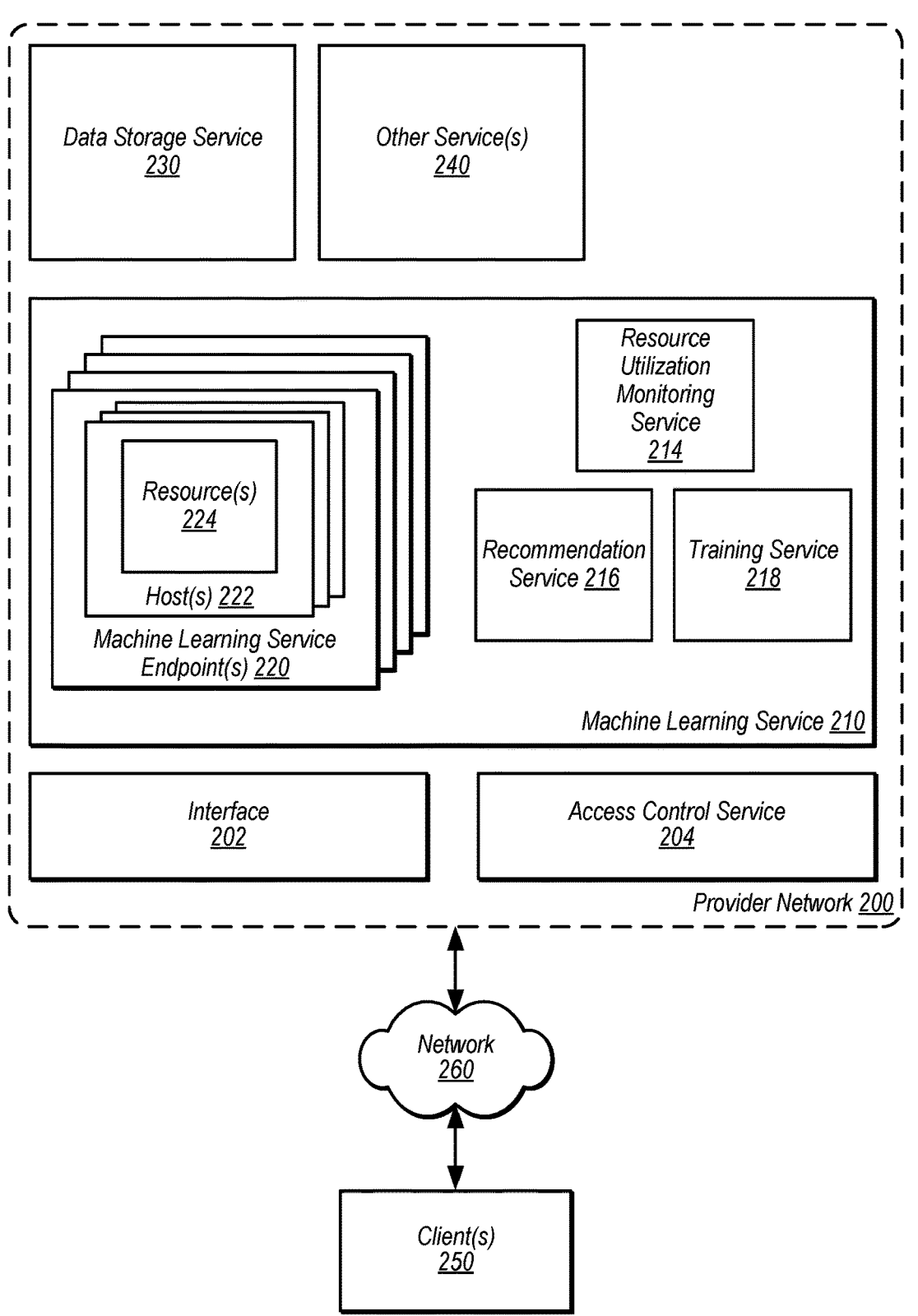
FIG. 2 illustrates a provider network 200 configured to provide services to one or more clients 250 via a network 260, according to some embodiments.

FIG. 2 illustrates a provider network 200 configured to provide services to one or more clients 250 via a network 260, according to some embodiments. The provider network 200 may be implemented on or across one or more computing devices comprising respective processors and respective memories. Different computing devices of the provider network 200 may be configured to provide different functionalities to provide services via the provider network 200.

The clients 250 may include respective computing devices configured to communicatively interact with the services offered by the provider network 200. The provider network 200 may implement an interface 202 configured to allow data interactions between the provided services and the clients 250. The interface 202 may be a public-facing application programmatic interface (API) configured to receive requests via the network 260. For example, the interface 202 may include a public API that is accessible via the public Internet.

The provider network 200 may restrict access to the provided services in accordance with access controls, according to some embodiments. The provider network 200 may include an access control service 204 configured to control access to the various services provided by the provider network 200. For example, the access control service 204 may control access to particular services by particular ones of the clients 250.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

As noted above, provider network 200 may implement various computing resources or services, such as a machine learning service 210, data storage service 230, and other service(s) 240 which may be any other type of network based services, including various other types of storage (e.g., database service or an object storage service), data processing, analysis, communication, event handling, visualization, and security services not illustrated.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Machine learning service 210 may offer machine learning computing resources and according to various configurations for client(s) 250 operation. For example, various host systems (e.g., computing system 900 in FIG. 9), which may offer different capabilities and features for hosted machine learning inferences, may serve as hosts for one or more machine learning service endpoint(s) 212. Machine learning service endpoints(s) 212 may implement machine learning models to generate inferences in response to inference requests from clients 250.

The machine learning service 210 may implement various computing resources to provide various services that supplement the machine learning service 210. The machine learning service 210 may provide a resource utilization monitoring service 214, a recommendation service 216, and a training service 218. The resource utilization monitoring service 214 may monitor resource utilization and generate utilization metrics for the machine learning service endpoints 212. The utilization metrics may be provided to the recommendation service 230 to generate recommended computing resource configurations to be applied to the machine learning service endpoints 212. The training service 218 may be configured to train machine learning models that are implemented by the machine learning service 210.

In various embodiments, machine learning service endpoint(s) 212 may be implemented with a specified computational capacity (which may be specified by indicating the type and number of CPUs, the main memory size, and so on) and a specified software stack (e.g., a particular version of an operating system, which may in turn run on top of a hypervisor). Machine learning service endpoint(s) 212 may be a number of different types of computing devices, used singly or in combination, to generate inferences, including general purpose or special purpose computer servers, storage devices, network devices and the like. In some embodiments client(s) 250 or other any other user may be configured (and/or authorized) to direct network traffic to machine learning service endpoint(s) 212.

In one embodiment, each of the machine learning service endpoints 212 may correspond to one of several instance families. An instance family may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance family can have a specific ratio of processing, local storage, memory, and networking resources, and different instance families may have differing types of these resources as well. Multiple sizes of these resource configurations can be available within a given instance family, referred to as "instance types." Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

Machine learning service endpoints 212 may operate or implement a variety of different frameworks, such as application server instances, general purpose or special-purpose operating systems, platforms that support various interpreted or compiled programming languages such as Ruby, Perl, Python, C, C++ and the like, or high-performance computing platforms) suitable for performing client(s) 250 applications, without, for example, requiring the client(s) 250 to access an instance. Applications (or other software operated/ implemented by a machine learning service endpoint 212 and may be specified by client(s), such as custom and/or off-the-shelf software.

In some embodiments, machine learning service endpoints 212 may have different types or configurations based on expected resource utilizations. The resource utilization of a particular compute instance may be defined as the ratio of the amount of computational resources are in use compared to the total amount of computational resources for the instance.

Virtual compute instance configurations may also include machine learning service endpoints 212 with a general or specific purpose, such as computational workloads for compute intensive applications (e.g., machine learning model inferences, high-traffic web applications, ad serving, batch processing, video encoding, distributed analytics, high-energy physics, genome analysis, and computational fluid dynamics), graphics intensive workloads (e.g., machine learning model inferences, game streaming, 3D application streaming, server-side graphics workloads, rendering, financial modeling, and engineering design), memory intensive workloads (e.g., machine learning model inferences, high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of machine learning service endpoints 212 may also include their location, in a particular data center, availability zone, geographic, location, etc. and (in the case of reserved compute instances) reservation term length.

Machine learning service 210 may implement control plane 211, which may include various features to manage machine learning service endpoints 212 on behalf of client (s) 250, in some embodiments. For example, control plane 211 may implement various performance monitoring to ensure performance guarantees for instance(s), such as those specified by Service Level Agreements (SLAs) are met. Control plane 211 may also implement a management interface 216, which may support various operations to configure or enable features, deploy, start, stop, pause, resume, or other controls for instance(s) 219. Control operation dispatch 217 may implement various workflows or invoke various micro-services (not illustrated). Control plane 211 may also support various features related to implementing hibernation techniques, as discussed in detail below with regard to FIGS. 3-6, including hibernation management 212, instance deployment 213, host capability tracking 214, and instance support tracking 215.

Interface 202 may include various types of interfaces, such as a command line interface, graphical user interface, and/or programmatic interface (e.g., Application Programming Interfaces (APIs)) in order to perform requested operations. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Provider network 200 may also implement data storage service 220, in various embodiments, for performing storage operations. Data storage service 220 may be a storage system that provides block level storage for storing one or more sets of data volumes of data that may be mapped to particular clients 250, providing virtual block-based storage (e.g., hard disk storage or other persistent storage) as a contiguous set of logical blocks.

Generally speaking, clients 250 may encompass any type of client configurable to submit network-based requests to provider network 200 via network 260, including requests for storage services (e.g., a request to create a replication job in migration service 230, etc.). For example, a given client 250 may include a suitable version of a web browser or may include a plug-in module or other type of code module that may execute as an extension to or within an execution environment provided by a web browser. Alternatively, a client 250 may encompass an application (or user interface thereof), a media application, an office application or any other application that may make use of resources in provider network 200 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

Clients 250 may convey network-based service requests to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, control plane components as well as external networks 260 (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 250 may be attached to the overlay network so that when a client 250 provides an IP address that they want to send packets to, the IP address is run in virtual space by communicating with a mapping service that knows where the IP overlay addresses are.

Figure 3:
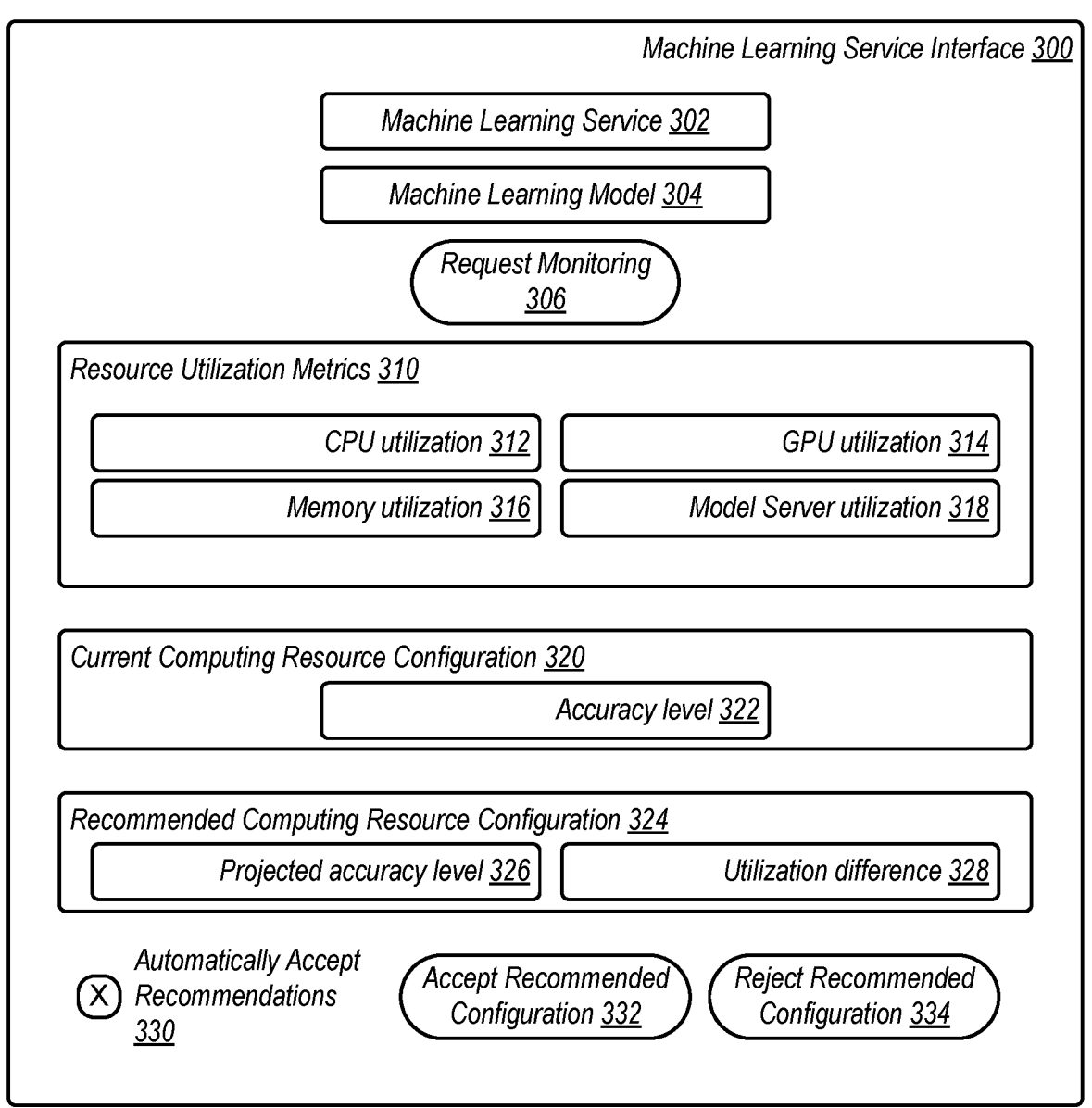
FIG. 3 illustrates a machine learning service interface 300, according to some embodiments.

FIG. 3 illustrates a machine learning service interface 300, according to some embodiments. The machine learning service interface 300 may include a user interface presented to a client (e.g., the clients 106 of FIG. 1 or the clients 250 of FIG. 2) and configured to receive various inputs and interactions directed to the machine learning service (e.g., the machine learning service 102 of FIG. 1 or the machine learning service 206 of FIG. 2).

The machine learning service interface 300 may include various display elements configured to display information and receive inputs from clients, according to some embodiments. The machine learning service interface 300 may include a display element that identifies a machine learning service 302 and a machine learning model 304. The machine learning service 302 may include hosts and compute instances configured to implement the machine learning model 304. The client may interact with a UI element to request monitoring 304 for the machine learning service 302 to monitor performance of the machine learning model 304. In some situations, the client may specify the machine learning model 304 to be applied by the machine learning service 302. For example, the client may assign or change the machine learning model 304 on demand.

The machine learning service 302 may monitor the performance and generate utilization metrics for the computing resources that are implementing the machine learning model 304, according to some embodiments. The machine learning service interface 300 may display resource utilization metrics 310 including representations of individual metrics tracked and recorded by the machine learning service 302. For example, the resource utilization metrics 310 may include a CPU utilization 312, a GPU utilization 314, a memory utilization 316, and a model server utilization 318. The resource utilization metrics 310 may be expressed as a numerical value, a ratio, a percentage, colored indicators, or any other type of display element.

The machine learning service interface 300 may also indicate a current computing resource configuration 320, according to some embodiments. The current computing resource configuration 320 may include information that indicates various hosts, instances or computing resources that are currently configured to implement at least a portion of the machine learning model 304. The machine learning service 302 may perform an accuracy analysis to determine accuracy levels of implemented machine learning models. The current computing resource configuration 320 may also indicate an accuracy level 322 for the machine learning model 304 while implemented by the computing resources. The accuracy level 322 may indicate how accurate the machine learning model 304 was in generating inferences according to various data sets. In some embodiments, the accuracy level 322 may be expressed as a percentage or ratio that compares a quantity of accurate inferences against a total quantity of inferences.

The machine learning service 302 may also include a recommendation service configured to provide recommended computing resource configurations to improve performance of the machine learning model 304, according to some embodiments. The machine learning service interface 300 may indicate a recommended computing resource configuration 324 to the client. In some embodiments, the recommended computing resource configuration 324 may indicate possible modifications or adjustments to the current computing resource configuration 320. In other embodiments, the recommended computing resource configuration 324 may indicate types of hosts or instances to be provisioned to implement the machine learning model 304. The recommended computing resource configuration 324 may also include a projected accuracy level 326. In some embodiments, the projected accuracy level 326 may indicate a relative difference between the projected accuracy level 326 and the accuracy level 322 of the current computing resource configuration 320.

The recommended computing resource configuration 324 may also indicate a difference between the recommended computing resource configuration 324 and the current computing resource configuration 320, according to some embodiments. For example, the recommended computing resource configuration 324 may indicate a utilization difference 328. The utilization difference 328 may indicate modifications that are recommended to be made to the current computing resource configuration 320. In some embodiments, the utilization difference 328 may be abstracted to limit the amount of extraneous information presented to the client.

The machine learning service interface 300 may include a selectable option to allow the client to automatically accept recommendations 330, according to some embodiments. By selecting the UI element for automatically accept recommendations 330, the machine learning service 302 may automatically apply the recommended computing resource configuration 324 in response to generation of the recommended computing resource configuration 324. The machine learning service interface 300 may also include UI elements for manually accepting the recommended configuration 332 and rejecting the recommended configuration 334. The machine learning service 302 may apply the recommended computing resource configuration 324 in response to the client interacting with the UI element for accepting the recommended configuration 332.

Figure 4:
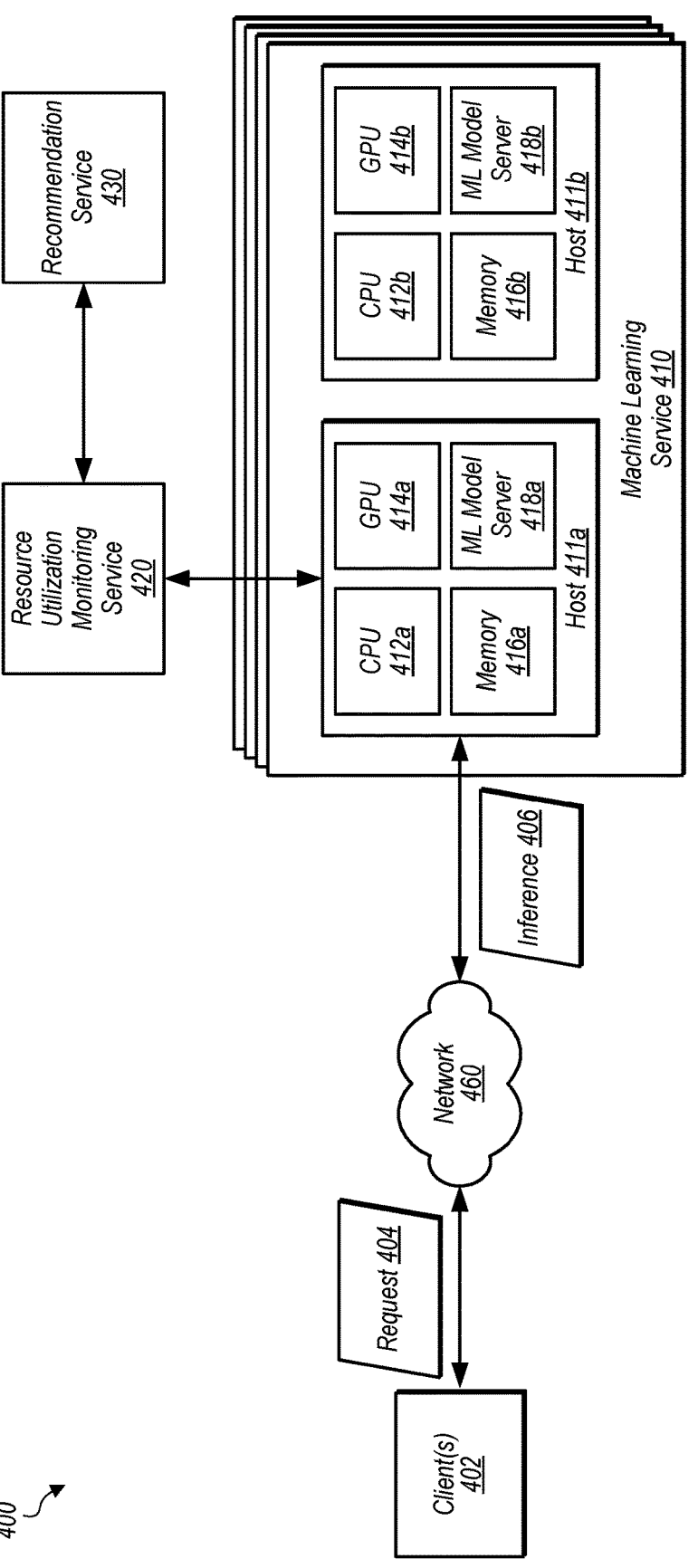
FIG. 4 illustrates a system 400 for generating inferences according to a machine learning model, according to some embodiments.

FIG. 4 illustrates a system 400 for generating inferences according to a machine learning model, according to some embodiments. The system 400 may include one or more clients 402, a network 460, machine learning service 410, a resource utilization monitoring service 420, and a recommendation service 430, according to some embodiments. The clients 402 may communicate with the machine learning service 410 via a network 460, according to some embodiments. In some embodiments, the machine learning service 410 may be implemented as part of a machine learning service, such as the machine learning service 102 of FIG. 1 or the machine learning service 210 of FIG. 2. In some implementations, the clients 402 may access the machine learning service 410 according to an interface provided by the machine learning service 410.

A client 402 may be configured to generate an inference request 404 that includes an input dataset, according to some embodiments. The client 402 may send the inference request 404 to a host 411*a* of the machine learning service 410. In some embodiments, the client 402 may send the request 404 via an interface configured to provide access to the machine learning service 410, such as the machine learning service interface 300 of FIG. 3. The machine learning service 410 may include multiple hosts implemented by various hardware components. For example, the machine learning service 410 a host 411*a* and a host 411*b* configured to provide computing resources to the client 402. In some embodiments, the hosts 411 may be configured to provide virtualized compute instances. The hosts may include respective computing resources. For example, the host 411*a* may include a CPU 412*a*, a GPU 414*a*, a memory 416*a*, and a machine learning model server 418*a*. The machine learning model server 418*a* may provide a machine learning model to generate the inferences requested by the client 402. The host 111*a* may receive the request 404 and generate an inference based on applying the machine learning model to input datasets indicated by the request 404.

The request 404 may also include a monitoring request for the machine learning service to monitor the computing resources that implement the machine learning model, according to some embodiments. Based on the monitoring request, the machine learning service may provision a resource utilization monitoring service 420 to monitor the computing resources that implement the machine learning model. For example. The resource utilization monitoring service 430 may monitor the host 411*a*, including the CPU 412*a*, the GPU 414*a*, the memory 416*a*, and the machine learning model server 418*a*, while the host 411*a* is generating inferences on behalf of the client 402. The resource utilization monitoring service 420 may report utilization metrics to a recommendation service 430 configured to determine recommended computing resource configurations to improve efficiency of the machine learning model.

The host 411*a* may generate an inference 406 according to the machine learning model and the input datasets, according to some embodiments. The host 411*a* may return the inference 406 to the client 402 via the network 460. In some embodiments, the host 411*a* may send the inference 406 to the recommendation service 430 for additional analysis. For example, the recommendation service 430 may perform an accuracy analysis for the machine learning model based on the inference 406.

Figure 5:
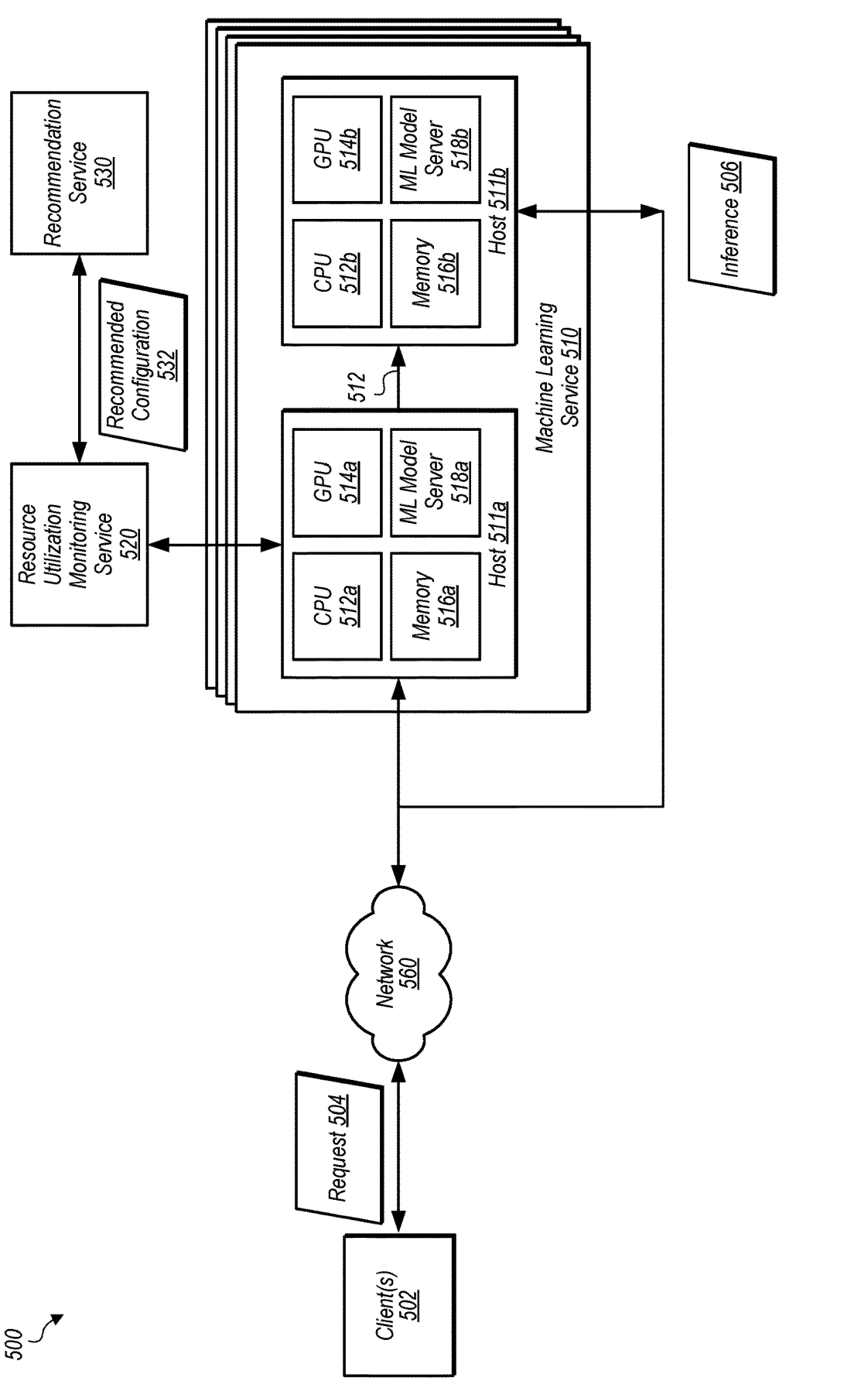
FIG. 5 illustrates a system 500 for a machine learning service applying a re

FIG. 5 illustrates a system 500 for a machine learning service applying a recommended configuration to computing resources, according to some embodiments. The system 500 may include one or more clients 502, a network 560, machine learning service 510, a resource utilization monitoring service 520, and a recommendation service 530, according to some embodiments. The clients 502 may communicate with the machine learning service 510 via a network 560, according to some embodiments. In some embodiments, the machine learning service 510 may be implemented as part of a machine learning service, such as the machine learning service 102 of FIG. 1 or the machine learning service 210 of FIG. 2. In some implementations, the clients 502 may access the machine learning service 510 according to an interface provided by the machine learning service 510.

A client 502 may be configured to generate an inference request 504 that includes an input dataset, according to some embodiments. The client 502 may send the inference request 504 to a host 511*a* of the machine learning service 510. In some embodiments, the client 502 may send the request 504 via an interface configured to provide access to the machine learning service 510, such as the machine learning service interface 300 of FIG. 3. The machine learning service 510 may include multiple hosts implemented by various hardware components. For example, the machine learning service 510 a host 511*a* and a host 511*b* configured to provide computing resources to the client 502. In some embodiments, the hosts 511 may be configured to provide virtualized compute instances. The hosts may include respective computing resources. For example, the host 511*a* may include a CPU 512*a*, a GPU 514*a*, a memory 516*a*, and a machine learning model server 518*a*. The machine learning model server 518*a* may provide a machine learning model to generate the inferences requested by the client 502. The host 111*a* may receive the request 504 and generate an inference based on applying the machine learning model to input datasets indicated by the request 504.

The request 504 may also include a monitoring request for the machine learning service to monitor the computing resources that implement the machine learning model, according to some embodiments. Based on the monitoring request, the machine learning service may provision a resource utilization monitoring service 520 to monitor the computing resources that implement the machine learning model. For example. The resource utilization monitoring service 530 may monitor the host 511*a*, including the CPU 512*a*, the GPU 514*a*, the memory 516*a*, and the machine learning model server 518*a*, while the host 511*a* is generating inferences on behalf of the client 502. The resource utilization monitoring service 520 may report utilization metrics to a recommendation service 530 configured to determine recommended configurations to improve efficiency of the machine learning model.

The recommendation service 530 may analyze utilization metrics provided by the resource utilization monitoring service 520 and accuracy levels of the machine learning model to determine whether a current resource configuration for the machine learning service 510 may be improved. For example, the recommendation service 530 may determine that an additional or different host or instance should be implemented to improve performance of the machine learning model. The recommendation service 530 may generate a recommended configuration 532 to be sent to the resource utilization monitoring service 520 or the machine learning service 510, according to various embodiments.

The machine learning service 510 may receive the recommended configuration 532 from the recommendation service 530. The machine learning service 510 may apply the recommended configuration 532 by adjusting various computing resources. For example, the machine learning service may divert at least a portion of throughput from the host 511*a* to the host 511*b*, as shown at 512. The host 511*b* may include respective computing resources such as a CPU 512*b*, a GPU 514*b*, a memory 516*b*, and a machine learning model server 518*b*, according to various embodiments. The host 512*a* may generate an inference 506 according to the machine learning model and the input datasets, according to some embodiments. The host 512*a* may return the inference 506 to the client 502 via the network 560.

FIG. 6 is a flowchart diagram illustrating a method 600 for determining recommended computing resource configurations for a machine learning model, according to some embodiments. The method 600 may be implemented by various hardware components provisioned for a machine learning service, such as the machine learning service 102 of FIG. 1, the machine learning service 210 of FIG. 1, the machine learning service 410 of FIG. 4, or the machine learning service 510 of FIG. 5, in various embodiments.

The method 600 may include deploying a machine learning model on computing resources that are configured to use the machine learning model to generate inferences in response to inference requests, at 602. The computing resources may be arranged or configured as service endpoints for the machine learning service, according to some embodiments. The service endpoints may include respective computing resources, such as CPUs, GPUs, memories or machine learning model servers, configured to implement or execute the machine learning model. The service endpoints may receive the inference requests including input datasets. The machine learning model may be applied to the input datasets to generate the inferences.

The method 600 may also include monitoring the machine learning model deployed on the computing resources, at 604. The machine learning service may include a resource utilization monitoring service configured to monitor implementation of the machine learning model, according to some embodiments. The resource utilization monitoring service may be configured to monitor different aspects of the service endpoints.

The method 600 may also include recording utilization metrics of the computing resources that perform the different inference requests, at 606. The utilization metrics may include one or more of a CPU utilization metric, a GPU utilization metric, a memory utilization metric, or a model server utilization metric, according to some embodiments. Additional metrics may be recorded for various computing resources that may be implemented for the machine learning service. The additional metrics may be aggregated with the utilization metrics that have already been recorded. Recording the utilization metrics may be included as part of the monitoring of the machine learning model, according to some embodiments.

The method 600 may further include recording the different inference requests, at 608. In some embodiments, the different inference requests may be recorded such that the respective utilization metrics may be correlated and cross-referenced with the types of inference requests. Downline analysis of the utilization metrics may be viewed in context of the different inference requests because different types of inference requests may have different demands on the computing resources. Recording the different inference requests may be included as part of the monitoring of the machine learning model, according to some embodiments.

The method 600 may also include recording the different inferences, at 610. The inferences generated by the machine learning model in response to the different inference requests may be recorded to correlate the generate inferences with the utilization metrics, according to some embodiments. Recording the generated inferences may be included as part of the monitoring of the machine learning model, according to some embodiments. In various embodiments, 606, 608, and 610 may be performed in any order or in parallel with each other.

The method 600 may further include generating a recommended computing resource configuration for the machine learning model based on the utilization metrics of the computing resources and an optimization objective for utilizing the computing resources, at 612. The recommended computing resource configuration may indicate various settings or configurations for the computing resources that implement the machine learning model to generate the inferences, according to some embodiments. In some embodiments, the recommended computing resource configuration may indicate one or more modifications from a current configuration of the computing resources. In some situations, the optimization objective may include reducing workloads on one or more of the computing resources. In other situations, the optimization objective may include reducing computational waste or underutilized computing resources. As another example, the optimization objective may include increasing performance of the machine learning model, such as increasing a quantity of generated inferences within a certain period of time. In other embodiments, the recommended computing resource configuration may include changing a type of instance used to host the machine learning model. In other embodiments, the recommended computing resource configuration may include changing an auto-scaling policy for dynamically changing the resource configuration. For example, the auto-scale policy may be too aggressively changing configurations while a more gradual approach would be optimal for the changes in workload patterns. In yet other embodiments, the recommended configuration may include modifying security to increase or decrease security controls on an application utilizing the machine learning model.

The method 600 may also include performing an accuracy analysis for the machine learning model deployed on the recommended computing resource configuration using the recorded different inference requests and the recorded respective inferences, at 614. The machine learning service may include an accuracy analysis service configured to analyze an accuracy of generated inferences for various datasets. The accuracy analysis may be configured to determine a predicted accuracy level for a recommended computing resource configuration. The accuracy analysis may also be configured to determine an accuracy level for the machine learning model executing at a given configuration of computing resources based on the output inferences and the datasets that are input to the machine learning model. The accuracy analysis may result in an accuracy level that may be expressed as a percentage or ratio of accurate inferences against a total quantity of inferences.

In some embodiments, the machine learning service may also determine whether the projected accuracy level satisfies a threshold accuracy level. Based on a determination that the projected accuracy level satisfies the threshold accuracy level, the machine learning service may provide the recommended computing resource configuration.

The method 600 may conclude by providing the recommended computing resource configuration for the deployed machine learning model, at 616. The machine learning service may provide the recommended computing resource configuration to a destination. In some embodiments, the machine learning service may provide the recommended computing resource configuration to a client to allow the client to decide whether to implement the recommended computing resource configuration. In other embodiments, the machine learning service may provide the recommended computing resource configuration to an automated system to implement the recommended computing resource configuration based on a determination that efficiency is increased while the projected accuracy level is not lower than a current accuracy level than a threshold amount.

FIG. 7 is a flowchart diagram depicting a method 700 for generating a recommended computing resource configuration for hosting a machine learning model, according to some embodiments. The method 700 may be implemented by various hardware components provisioned for a machine learning service, such as the machine learning service 102 of FIG. 1, the machine learning service 210 of FIG. 1, the machine learning service 410 of FIG. 4, or the machine learning service 510 of FIG. 5, in various embodiments.

The method 700 may include recording utilization metrics of computing resources hosting a machine learning model to generate different inferences in response to different inference requests, at 702. In some embodiments, the machine learning service may include a resource monitoring service configured to monitor resource utilization of the computing resources while implementing the machine learning model. The computing resources may include multiple service endpoints that respectively comprise a CPU, a GPU, a memory, and a model server, according to various embodiments.

The method 700 may include determining CPU utilization metrics, at 704. The method 700 may include determining GPU utilization metrics, at 706. The method 700 may include determining memory utilization metrics, at 708. The method 700 may include determining model server utilization metrics, at 710. Individual ones of the CPU utilization metrics, the GPU utilization metrics, the memory utilization metrics, and the model server utilization metrics may be expressed as a percentage or ratio between a current utilization and a total utilization capacity. In various embodiments, 704, 706, 708, and 710 may be performed asynchronously with respect to the other metrics.

The method 700 may include identifying a bottleneck resource of the computing resources according to the CPU utilization metrics, the GPU utilization metrics, the memory utilization metrics, and the model server utilization metrics compared to respective metric thresholds, at 712. In some embodiments, the machine learning service may determine whether a particular type of computing resource is reducing overall throughput of the computing resources for the machine learning model. The machine learning service may compare the respective utilization metrics to the respective metric thresholds to determine that the particular type of resource utilization is underutilized or overutilized. The bottleneck resource may be determined to be the computing resource that reduces output efficiency for the machine learning model.

The method 700 may further include generating a recommended computing resource configuration for the machine learning model based on identification of the bottleneck resource, at 714. The machine learning service may include a recommendation service configured to generate recommended configurations. The recommendation service may be configured to analyze the utilization metrics and the identified bottleneck resource to determine potential modifications to be made to the computing resources to improve efficiency. In some embodiments, the recommended computing resource configuration may include a quantity of computing resources and respective configurations for the computing resources. The recommended computing resource configuration may include one or more modifications to be applied to a current configuration of the computing resources. The recommended computing resource configuration may represent a configuration that is recommended by the machine learning service to improve efficiency of the machine learning model implemented by the computing resources.

The method 700 may conclude by providing the recommended computing resource configuration for the deployed machine learning model, at 716. In some embodiments, the recommendation service may display the recommended computing resource configuration to a system administrator to determine whether to apply the recommended computing resource. In other embodiments, the recommendation service may provide the recommended computing resource configuration to an automated system configured to automatically apply the recommended computing resource configuration based on an accuracy analysis for a projected accuracy level of the recommended computing resource configuration.

FIG. 8 is a flowchart diagram illustrating a method 800 for applying changes to a computing resource configuration, according to some embodiments. The method 800 may be implemented by one or more computing resources implemented by a machine learning service, such as the machine learning service 102 of FIG. 1, the machine learning service 210 of FIG. 1, the machine learning service 410 of FIG. 4, or the machine learning service 510 of FIG. 5, in various embodiments. In some implementations, the computing resources may be implemented as one or more hosts or virtualized compute instances at a service endpoint for the machine learning service.

The method 800 may include implementing, at one or more computing resources, a machine learning model, at 802. The machine learning model may be configured to generate inferences based on input datasets provided by clients, according to various embodiments. The method 800 may also include receiving inference requests from a client, at 804. The inference requests may include the input datasets to which the machine learning model is to be applied. The method 800 may further include generating the inferences based on applying the machine learning model to inputs included in the inference requests, at 806.

The method 800 may also include receiving, from a recommendation service, a recommended computing resource configuration. The recommendation service may be included as part of the machine learning service. The recommendation service may generate the recommended computing resource configuration based on projected utilizations of the computing resources and projected accuracy levels.

The method 800 may further include determining one or more changes to a current configuration of the one or more computing resources based on differences between the current configuration and the recommended computing resource configuration, at 810. In some embodiments, the computing resources may determine that one or more hosts of the service endpoint are to be modified according to the one or more changes. In some situations, hosts may be added or removed. In other situations, different types of hosts may be provisioned and deployed. The method 800 may conclude by applying the one or more changes to the current configuration, at 812.

Figure 9:
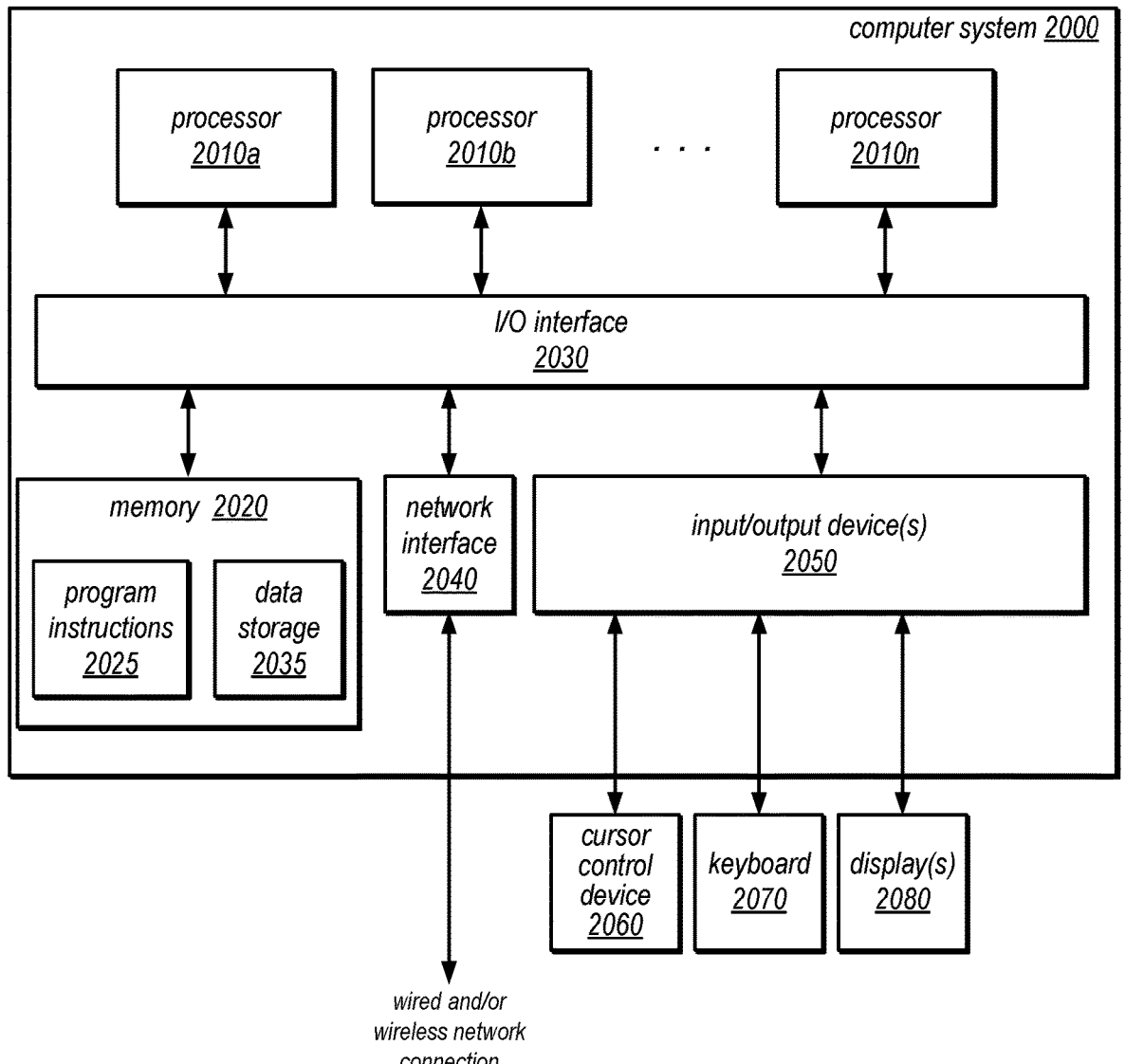
FIG. 9 illustrates a block diagram illustrating an example computer system that may be used in some embodiments.

As shown in FIG. 9, memory 2020 may include program instructions 2025, that implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present embodiments may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A system, comprising:
one or more computing resources configured to host a machine learning model to generate respective inferences according to different inference requests;
one or more processors; and
a memory storing instructions that, when executed on or across the one or more processors, cause the one or more processors to implement a machine learning recommendation service to:
receive, from a client via an interface, a request to monitor the one or more computing resources;
monitor the machine learning model deployed on the one or more computing resources, wherein the monitoring comprises:
recording utilization metrics of the one or more computing resources performing the different inference requests;
recording the different inference requests; and
recording the respective inferences;
generate a recommended computing resource configuration for the machine learning model based, at least in part, on the utilization metrics of the one or more computing resources and an optimization objective for utilizing computing resources;
make a determination to provide the recommended computing resource configuration based, at least in part, on an accuracy analysis performed for the machine learning model deployed on the recommended computing resource configuration using the recorded different inference requests and the recorded respective inferences; and
provide the recommended computing resource configuration for the deployed machine learning model.

2. The system of claim 1, wherein to analyze the metrics the machine learning recommendation service is further configured to:
identify a bottleneck computing resource of the one or more computing resources according to one or more respective metrics of the utilization metrics not satisfying one or more utilization thresholds.

3. The system of claim 2, wherein the utilization metrics comprises one or more of:
a central processing unit (CPU) utilization metric;
a graphics processing unit (GPU) utilization metric;
a memory utilization metric; and
a machine learning model server utilization metric.

4. The system of claim 1, wherein the machine learning recommendation service is further configured to:

record additional metrics for additional instances of the machine learning model; and aggregate the metrics with the additional metrics.

5. The system of claim 1, wherein the machine learning recommendation service is further configured to:

train a recommendation model according to the accuracy analysis, the utilization metrics, and the machine learning model, wherein the recommendation model is configured to generate recommended computing resource configurations for deployment of the machine learning model on the one or more computing resources.

6. A method, comprising:

monitoring a machine learning model deployed on one or more computing resources that use the machine learning model to generate respective inferences according to different inference requests, wherein the monitoring comprises:

recording utilization metrics of the one or more computing resources performing the different inference requests;

recording the different inference requests; and recording the respective inferences;

generating a recommended computing resource configuration for the machine learning model based, at least in part, on the utilization metrics of the one or more computing resources and an optimization objective for utilizing computing resources;

making a determination to provide the recommended computing resource configuration based, at least in part, on an accuracy analysis performed for the machine learning model deployed on the recommended computing resource configuration using the recorded different inference requests and the recorded respective inferences; and providing the recommended computing resource configuration for the deployed machine learning model.

7. The method of claim 6, further comprising:

identifying a bottleneck computing resource of the one or more computing resources according to one or more respective metrics of the utilization metrics not satisfying one or more utilization thresholds.

8. The method of claim 7, wherein the utilization metrics comprises one or more of:

a central processing unit (CPU) utilization metric;

a graphics processing unit (GPU) utilization metric;

a memory utilization metric; and a machine learning model server utilization metric.

9. The method of claim 7, wherein the optimization objective comprises reducing workloads on the bottleneck computing resource.

10. The method of claim 6, further comprising:

applying the recommended computing resource configuration to the one or more computing resources.

11. The method of claim 6, further comprising:

recording additional metrics for additional instance of the machine learning model; and aggregating the metrics with the additional metrics.

12. The method of claim 6, further comprising:

training a recommendation model according to the accuracy analysis, the utilization metrics, and the machine learning model, wherein the recommendation model is configured to generate recommended computing resource configurations for deployment of the machine learning model on the one or more computing resources.

13. The method of claim 10, further comprising:

deploying the trained recommendation model; and generating the recommended computing resource configurations according to the trained recommendation model.

14. One or more computer-readable storage media storing instructions that, when executed on or across one or more processors, cause the one or more processors to:

monitor a machine learning model deployed on one or more computing resources that use the machine learning model to generate respective inferences according to different inference requests, wherein the monitoring comprises:

recording utilization metrics of the one or more computing resources performing the different inference requests;

recording the different inference requests; and recording the respective inferences;

generate a recommended computing resource configuration for the machine learning model based, at least in part, on the utilization metrics of the one or more computing resources and an optimization objective for utilizing computing resources;

determine to provide the recommended computing resource configuration based, at least in part, on an accuracy analysis performed for the machine learning model deployed on the recommended computing resource configuration using the recorded different inference requests and the recorded respective inferences; and provide the recommended computing resource configuration for the deployed machine learning model.

15. The one or more computer-readable storage media of claim 14, further comprising instructions that, when executed on or across the one or more processors, cause the one or more processors to:

identify a bottleneck computing resource of the one or more computing resources according to one or more respective metrics of the utilization metrics not satisfying one or more utilization thresholds.

16. The one or more computer-readable storage media of claim 15, wherein the utilization metrics comprises one or more of:

a central processing unit (CPU) utilization metric;

a graphics processing unit (GPU) utilization metric;

a memory utilization metric; and a machine learning model server utilization metric.

17. The one or more computer-readable storage media of claim 15, wherein the optimization objective comprises reducing workloads on the bottleneck computing resource.

18. The one or more computer-readable storage media of claim 14, further comprising instructions that, when executed on or across the one or more processors, cause the one or more processors to:

applying the recommended computing resource configuration to the one or more computing resources.

19. The one or more computer-readable storage media of claim 14, further comprising instructions that, when executed on or across the one or more processors, cause the one or more processors to:

recording additional metrics for additional instances of the machine learning model; and aggregating the metrics with the additional metrics.

20. The method of claim 6, further comprising:

training a recommendation model according to the accuracy analysis, the utilization metrics, and the machine learning model, wherein the recommendation model is configured to generate recommended computing resource configurations for deployment of the machine learning model on the one or more computing resources;

deploying the trained recommendation model; and generating the recommended computing resource configurations according to the trained recommendation model.

\* \* \* \* \*